US012386316B2

(12) United States Patent
Nussbaumer

(10) Patent No.: US 12,386,316 B2
(45) Date of Patent: Aug. 12, 2025

(54) THERMAL PROTECTION CASE FOR TIMEPIECE

(71) Applicant: Omega SA, Biel/Bienne (CH)

(72) Inventor: Billy Nussbaumer, La Cibourg (CH)

(73) Assignee: Omega SA, Biel/Bienne (CH)

( * ) Notice: Subject to any disclaimer, the term of this patent is extended or adjusted under 35 U.S.C. 154(b) by 402 days.

(21) Appl. No.: 18/048,997

(22) Filed: Oct. 24, 2022

(65) Prior Publication Data

US 2023/0205141 A1 Jun. 29, 2023

(30) Foreign Application Priority Data

Dec. 28, 2021 (EP) .................................... 21217993

(51) Int. Cl.
*G04B 43/00* (2006.01)

(52) U.S. Cl.
CPC .................................. *G04B 43/005* (2013.01)

(58) Field of Classification Search
CPC .............................. G04B 43/005; G04B 37/04
See application file for complete search history.

(56) References Cited

U.S. PATENT DOCUMENTS 3,740,944 A 6/1973 Chopard
3,807,236 A 4/1974 Leone

FOREIGN PATENT DOCUMENTS

CH 537 170 A 5/1973
CH 716 913 A2 6/2021
EP 2 755 094 A1 7/2014
WO WO 2018/215491 A1 11/2018

OTHER PUBLICATIONS

European Search Report issued Jun. 8, 2022 in European Application 21217993.1, filed on Dec. 28, 2021 (with English Translation of Categories of cited documents), 4 pages.

*Primary Examiner* — Renee S Luebke
*Assistant Examiner* — Matthew Daniel Hwang
(74) *Attorney, Agent, or Firm* — Oblon, McClelland, Maier & Neustadt, L.L.P.

(57) ABSTRACT

A thermal protection case for timepiece, including, in a casing, a device for holding a case of a timepiece, including first elastic pistons with mobile supports each including at least one component thermally less conductive than the casing and the case and creating a thermal barrier between them, and opposite second supports each including a pillar each with at least one component thermally less conductive than the casing and the case and creating a thermal barrier between them constituting a fixed banking support, or by a second elastic piston including a second mobile support arranged to come to bear on the case and including at least one component thermally less conductive than the casing and than the case and creating a thermal barrier between the casing and the second mobile support.

16 Claims, 6 Drawing Sheets

THERMAL PROTECTION CASE FOR TIMEPIECE

CROSS-REFERENCE TO RELATED APPLICATION

This application claims priority to European Patent Application No. 21217993.1 filed on Dec. 28, 2021, the entire disclosure of which is hereby incorporated herein by reference.

The invention relates to a thermal protection case for a timepiece, particularly a watch, and including, within a casing, means for holding a case of a timepiece.

The invention also relates to a timepiece assembly including such a thermal protection case, and at least one timepiece including a case of geometry compatible with the holding components included in this thermal protection case.

The invention relates to the field of the thermal protection of timepieces, particularly watches, used in severe temperature conditions, such as very high or very low temperatures, or significant diurnal differences for example.

TECHNOLOGICAL BACKGROUND

The thermal protection of timepieces, particularly of watches, intended to be subjected to harsh temperature conditions, particularly in aeronautics or astronautics, is difficult.

Often the timepiece is enclosed in a very voluminous casing, which causes discomfort to the user, and which makes reading or activation operations difficult.

SUMMARY OF THE INVENTION

The invention proposes to produce a thermal protection case for a timepiece, particularly a watch, which is compact, without discomfort for the user, with the lowest possible heat exchange between the outside environment and this timepiece.

To this end, the invention relates to a thermal protection case for a timepiece, according to claim 1.

The invention also relates to a timepiece assembly including such a thermal protection case, and at least one timepiece including a case of geometry compatible with the holding components included in this thermal protection case.

BRIEF DESCRIPTION OF THE FIGURES

The aims, advantages and features of the invention will be better understood upon reading the following detailed description, with reference to the appended drawings, wherein.

DETAILED DESCRIPTION OF THE INVENTION

Figure 1:
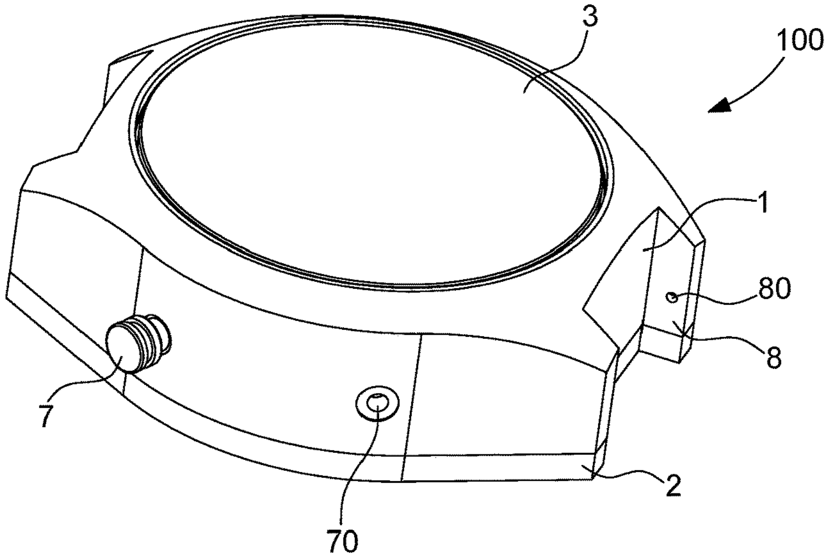
FIG. 1 shows, schematically and in perspective view, a thermal protection case according to the invention, including a casing, thermally insulating, of which here is protruding an actuator for a control of a function of a watch enclosed in this casing, which is shown here in closed position.
Figure 2:
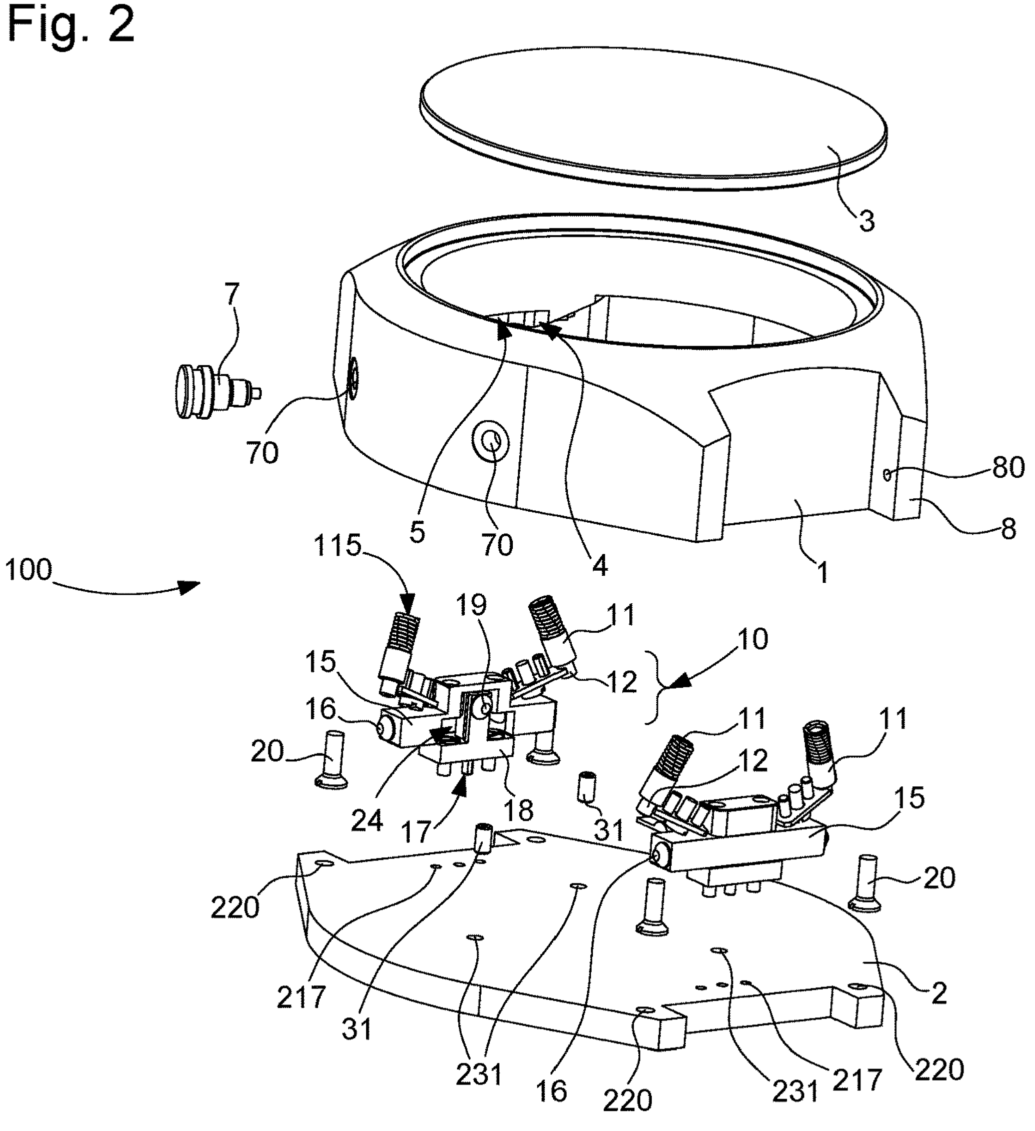
FIG. 2 shows, schematically and in exploded perspective view, the thermal protection case of FIG. 1, and it can be identified, from top to bottom, three main components of the casing: a crystal, an insulator casing, and a back; the actuator of FIG. 1 is shown next to the insulator casing. Between the back and the insulator casing can be seen the various upper and lower supports specific to the invention, for maintaining the insulation of a timepiece: in the upper portion, first elastic pistons, which each include a first mobile support arranged to come to bear on the first side of a watch case or similar, and, in the lower portion, second supports, here consisting of insulating fixed pillars, to come to bear on the same second side of the case, opposite this first side.
Figure 3:
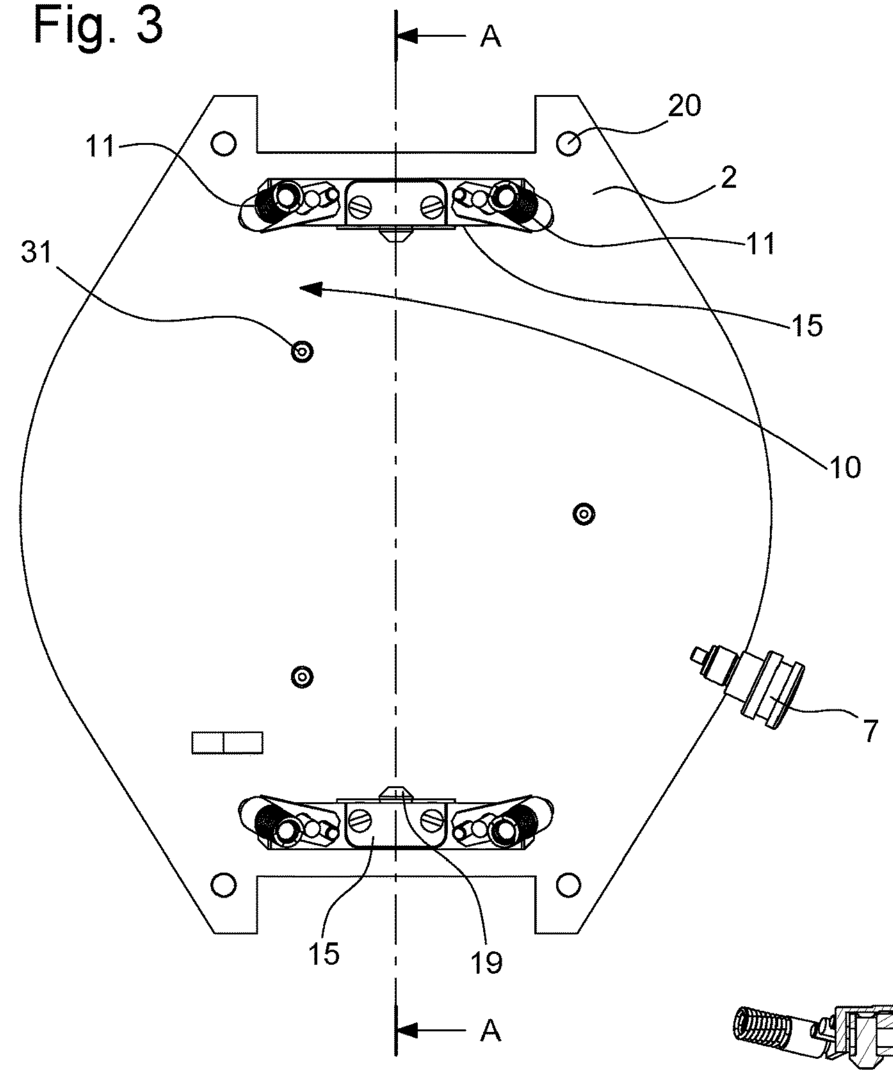
FIG. 3 shows, schematically and in plan view, the back, seen from the inside of this thermal protection case, and the various supports such that they are disposed in the operating position, to surround for example a watch case not shown, which are, in this non-limiting example; two pairs of first elastic pistons arranged to bear on the horns of such a case, and three fixed pillars disposed in triangle for the isostatism.
Figure 4:
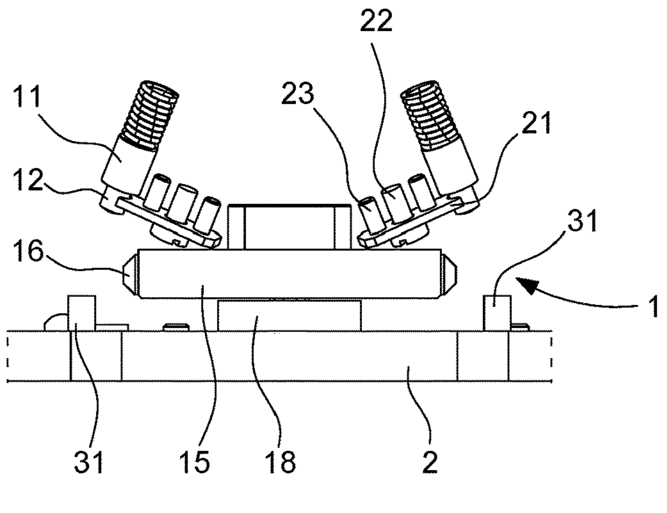
FIG. 4 shows, schematically and in sectional view AA of FIG. 3, a detail of a particular embodiment of these various supports, with an upper crosspiece for fastening intermediate plates, and a shock-resistant lower banking to improve the protection in the event of shocks.
Figure 5:
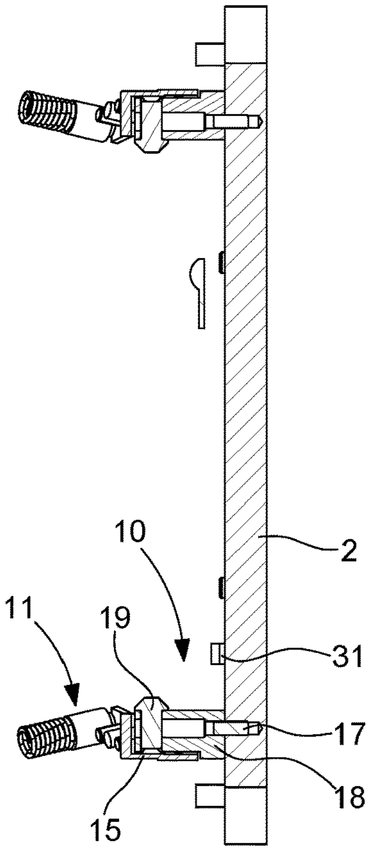
FIG. 5 shows the same mechanism, schematically and in sectional view perpendicular to the direction AA of FIG. 3.
Figure 6:
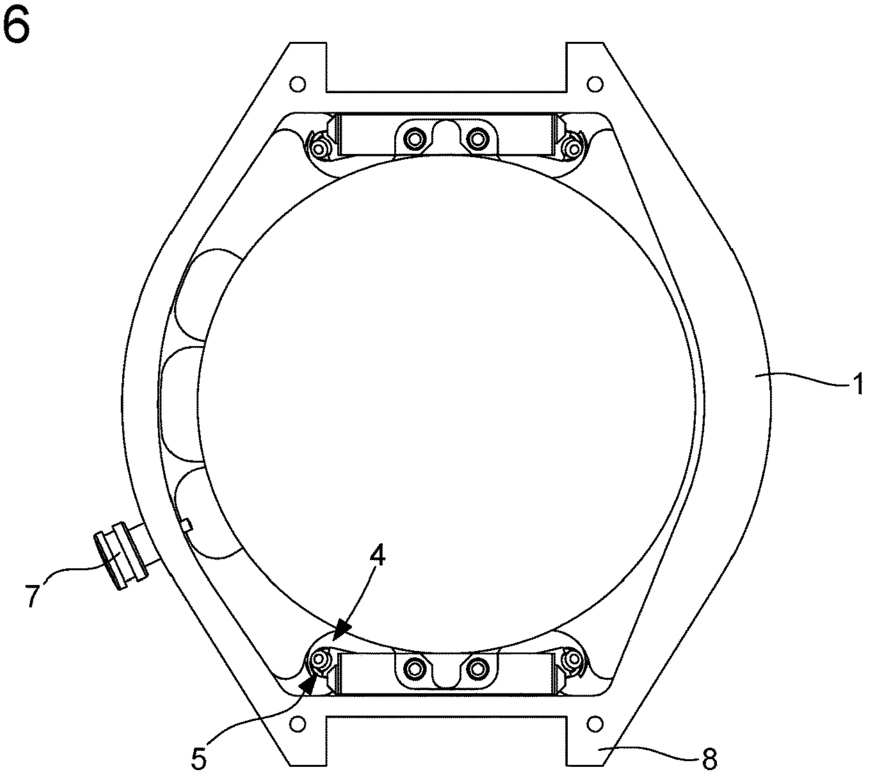
FIG. 6 shows, schematically and in plan view, the insulator casing, seen from the inside of this thermal protection case, with the housings and the bearing surfaces of the first elastic pistons.
Figure 7:
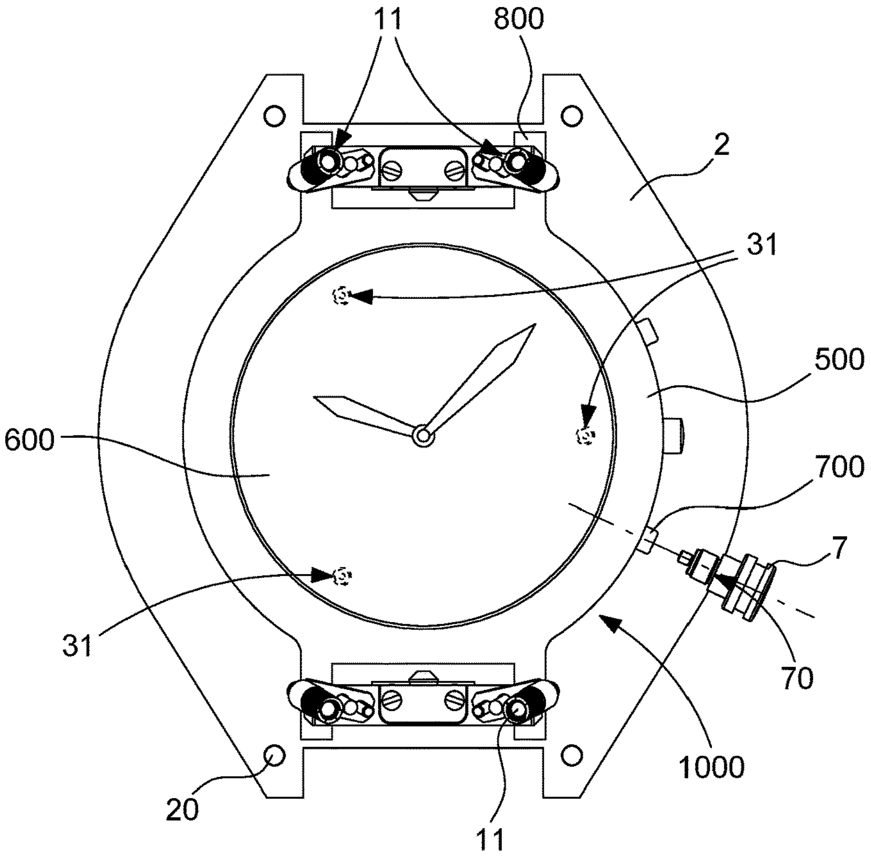
FIG. 7 shows, schematically and in plan view, a partial view of a timepiece assembly including the thermal protection case according to the invention, and a timepiece, here a watch, enclosed in a water-resistant manner and immobilised in this thermal protection case, this view only showing the back, the watch and its upper and lower supports, the insulator casing and the crystal of the thermal protection case not being shown.
Figure 8:
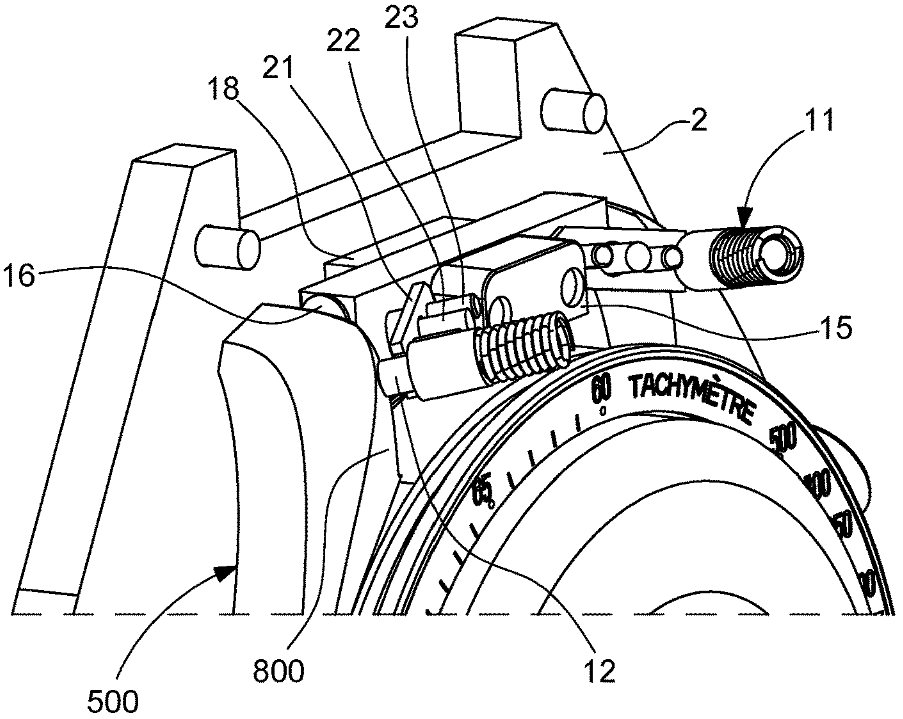
FIG. 8 shows, schematically and in perspective view, a detail of the same mechanism, wherein it can be seen the pressing of the first mobile supports on the horns of a watch case.
Figure 9:
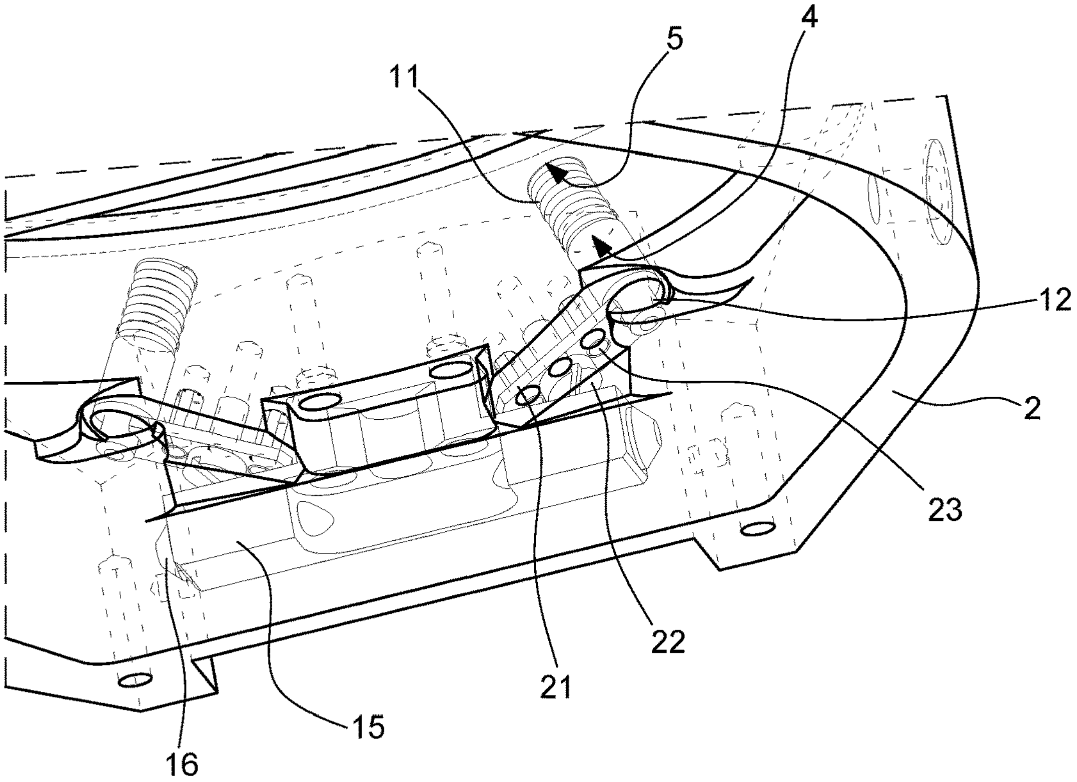
FIG. 9 shows, schematically and in perspective view, with some of the elements shown semi-transparently, another detail of the same mechanism, wherein it can be seen the first elastic pistons in their housings, and the pressing of the first mobile supports on the horns of a watch case.

The invention relates to a thermal protection case 100 for timepiece 1000, including, within a casing, means for holding 10 a case 500 of a timepiece 1000.

According to the invention, these holding means 10 include supports on either side of the case 500.

On the one hand, in order to come to bear on the same first side of the case 500, the holding means 10 include at least two first elastic pistons 11, which each include a first mobile support 12 arranged to come to bear on the first side of the case 500. Each first elastic piston includes at least one component thermally less conductive than the casing and than the case 500, and creating a thermal barrier between the casing and the case 500.

On the other hand, in order to come to bear on the same second side of the case 500 opposite the first side, the holding means 10 include at least three second supports, which each consist of, either, as shown in the figures, a pillar 31 made of material thermally less conductive than the casing and than the case 500 and constituting a fixed banking support, or in a variant not illustrated a second elastic piston including a second mobile support arranged to come to bear on the case 500 and including at least one component thermally less conductive than the casing and than the case 500 and creating a thermal barrier between the casing and the second mobile support.

More particularly, the casing includes at least one insulator casing 1 and a back 2, which are arranged to cooperate with one another in a water-resistant closing position under the action of closing means.

The insulator casing 1 and/or the back 2 includes or carries a crystal 3 fastened in a water-resistant manner and arranged for the observation of a timepiece 1000 enclosed in the thermal protection case 100.

More particularly, the insulator casing 1 and/or the back 2 and/or the crystal 3 is produced in a material thermally less conductive than the case 500 of the timepieces 1000 that the thermal protection case 100 is likely to enclose.

In an advantageous variant, the insulator casing 1 and/or the back 2 and/or the crystal 3 constitutes a double-walled Arsonval-Dewar vessel with inner vacuum between its two walls. More particularly, given the dimensions of these components, the insulator casing 1 is that which lends itself best to this type of embodiment.

More particularly, the insulator casing 1 includes housings 4, which are each arranged to house a first elastic piston 11, and which each include a banking bearing surface 5 of one end of the first elastic piston 11, and more particularly of a spring included in this first elastic piston 11. For example, these housings 4 consist of a blind bore or similar, the back of which constitutes the banking bearing surface 5, and that make it possible to guide in an imposed direction the first elastic pistons, to facilitate the installation of the timepiece 1000 in the case 100.

Figure 10:
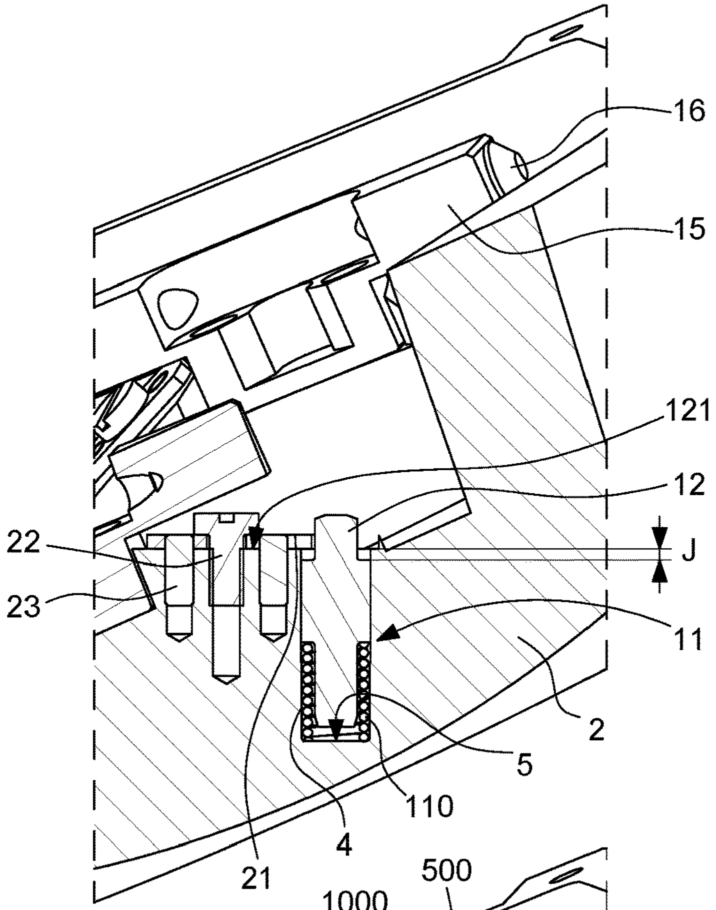
FIG. 10 shows, schematically and in perspective view truncated by a sectional plane passing through the axis of an elastic piston, and through the axis of screws and pins for holding a support plate, another detail of the same mechanism, without the watch case but in the compressed position of the first elastic springs corresponding to holding the watch, and wherein it can be seen the bearing surface of the insulator casing, and the pressing of the bearing plate on this bearing surface, and it can be seen a first elastic piston in its housing; the spring of the first elastic piston is compressed, the first mobile support includes a shoulder, which here is at a non-zero distance from the bearing plate.
Figure 11:
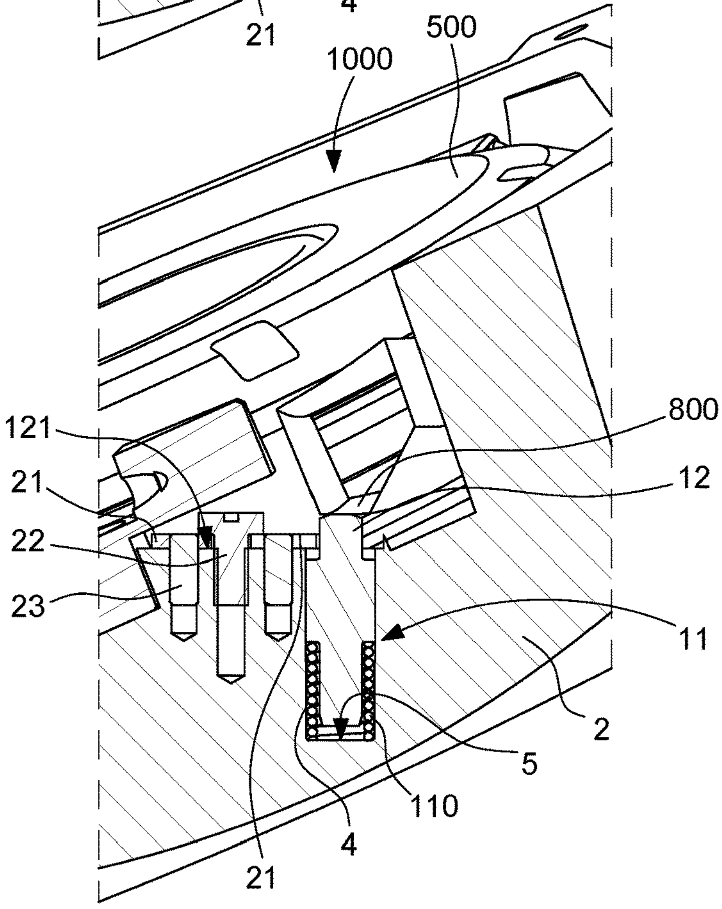
FIG. 11 is similar to FIG. 10, the watch case is this time shown, and it can be seen the pressing of the corresponding first mobile support on a horn of the watch case.
Figure 12:
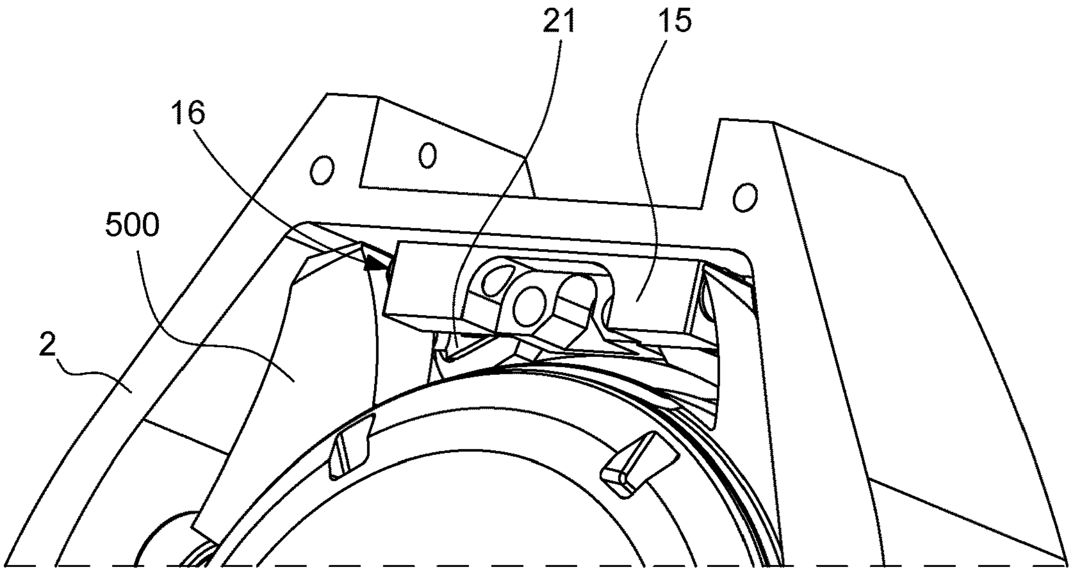
FIG. 12 shows, schematically and in perspective view, a detail of a timepiece assembly including this thermal protection case and a watch, the latter mounted in holding position, the back of the thermal protection case not being shown; it can be seen a crosspiece supporting transverse bankings between the horns of the watch, in the event of shock.
Figure 13:
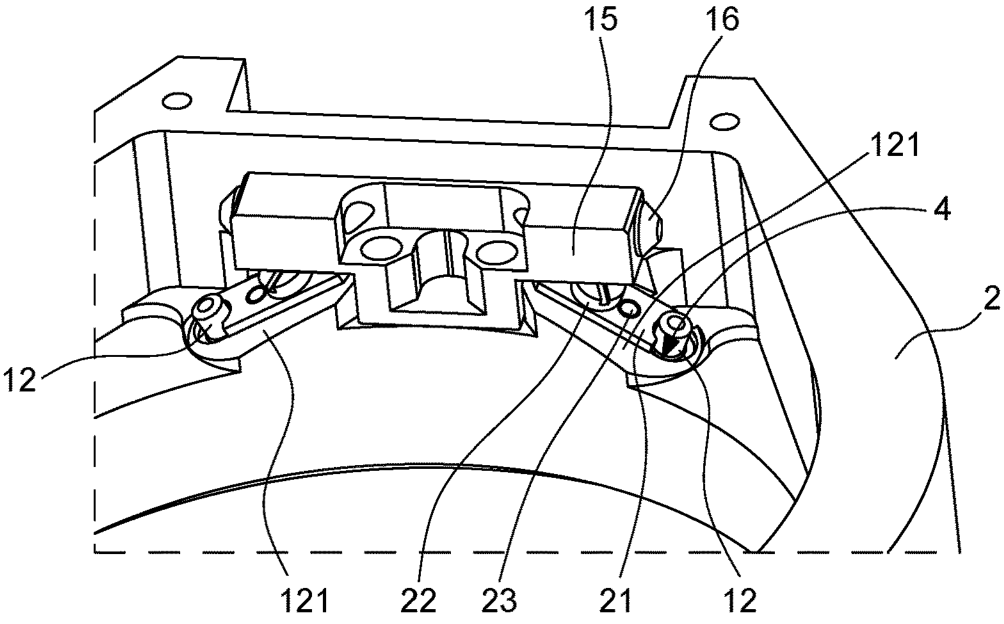
FIG. 13 is similar to FIG. 12, the watch not being shown, it can be seen the first supports at a distance from the respective support plates, which are fastened on the insulator casing.

The mobile supports 12 thus operate like pistons; they are held in their housings by plates 21, themselves fastened on a bearing surface 121 of the insulator casing 1 by screws 22 and pins 23 to ensure the positioning thereof, as can be seen in FIGS. 11 and 13. When the watch case 500 is installed in the protection case 100, the pistons are compressed and therefore are not abutting against the plates 21. FIGS. 10 and 11 show the pressing of the support plate 21 on this bearing surface 121; the spring 110 of the first elastic piston 11 is compressed, and it can be seen the pressing of the corresponding first mobile support 12 on a horn 800 of the watch case 500; the first mobile support 12 includes a shoulder, which here is at a non-zero distance J from the support plate 21.

In a variant not shown, these plates 21 are fastened by screws 22 and pins 23 on a crosspiece 15, which overhangs a shock-resistant banking 18 that will be explained below. This crosspiece 15 is preferably made of material thermally less conductive than the casing and than the case 500.

More particularly, the thermal protection case 100 includes at least three first elastic pistons 11, of which at least two are identical and constitute a pair arranged to exert distant and symmetrical presses on a case 500. More particularly, the thermal protection case 100 includes at least four first elastic pistons 11, constituting two pairs arranged to exert presses on distinct areas and located on either side of the timepiece 1000, but on the first side. More particularly, and as can be seen in the figures, each pair of first elastic pistons 11 forms a converging dihedral tending to bring the forces for pushing towards the longitudinal axis of the case 500.

More particularly, the back 2 includes at least one shock-resistant lower banking 18, made of material thermally less conductive than the case 500, and which is, in nominal unlocking position, at a distance from a timepiece 1000 bearingly mounted on the at least three second supports. This shock-resistant lower banking 18 is arranged to constitute a banking limiting the travel of the timepiece 1000 during a shock coming to unpoise it in relation to the second supports.

More particularly, at least one shock-resistant lower banking 18 is elastic, or constitutes, with a crosspiece 15, on which is likely to rest at least one plate 21, a chamber 24 containing an elastic return means such as a spring, or an elastomer gasket, or similar.

The mechanism advantageously includes respectively on the crosspiece 15 and on the shock-resistant lower banking 18, elements 16 and 19, which are bankings, respectively transverse and axial, intended to limit the movements of the watch case 500 in the event of shock. In static situations, the watch head 500 is in contact with the protection case 100 only by means of contact elements 12 and 31.

More particularly, at least one such shock-resistant lower banking 18 includes such an axial banking 19 mounted on elastic support, for the longitudinal positioning of a timepiece 1000 along the plane of symmetry of the horns 800 of the timepiece 1000, when it includes them.

In one variant, the holding element 16 is a transverse banking, made of low conductive material, at a distance from the watch except in the event of shock.

More particularly, the casing includes at least one communication port between the inner volume of the casing and an outside environment, that can be enclosed in a water-resistant manner and arranged to extract gas contained in the casing, or inject gas into the casing.

More particularly, the casing includes at least one control port 70 between the inner volume of the casing and an outside environment arranged to receive in a water-resistant manner an actuator 7 for an action of the user on a crown or a push-piece or a control pull-out piece included in the timepiece 1000.

More particularly, the insulator casing 1 includes outer horns 8 with housings 80 for fastening a bracelet.

More particularly, the components made of material thermally less conductive than the case 500 are made of PTFE, or of infusible crystalline structure polyimide.

The invention also relates to a timepiece assembly including such a thermal protection case 100, and at least one timepiece 1000 including a case 500 of geometry compatible with the first elastic pistons 11 and with the second supports included in the thermal protection case 100, particularly pillars 31.

In short, the thermal protection case 100, intended to protect a timepiece 1000, more particularly a watch, in relation to its environment, includes pistons limiting the thermal conduction. The timepiece 1000, more particularly a watch, is held by a system of pistons, including these first elastic pistons 11, which fulfil two functions: ensure the resistance of the watch, and minimise the conduction between the watch 1000 and the thermal protection case 100.

In the non-limiting application illustrated in the figures, four first elastic pistons 11, disposed by pairs, are mounted on the upper portion of the thermal protection case 100, at housings 24 of an insulator casing 1. The first elastic pistons 11 include elastic return means, particularly springs, which ensure the good resistance of the watch, and may in some cases filter the shocks. These first elastic pistons 11 act on the case 500 of the watch 1000, on the side of its bezel or of its main crystal, for example on the horns 800 of this case 500. Three fixed pillars 31 are mounted on a back 2 included in the thermal protection case 100, and serve as rigid supports on the other face of the watch, particularly its own back. The first elastic pistons 11 and the fixed pillars 31 have a shape aiming to minimise the contact surface with the watch, and each include at least one element made of low conductive material such as PTFE, or infusible crystalline structure polyimide such as the material "Vespel" or similar.

The banking system installed at each inter-horn of the watch makes it possible to limit the movement thereof in the event of vibrations and of shocks. In nominal position, the watch is not in contact with these bankings, in order to limit the conduction between the watch and the outer case. These bankings are produced in a low conductive material like the pistons and the pillars.

The thermal protection case 100, particularly including an insulator casing 1 constituting a double-walled Arsonval-Dewar vessel with inner vacuum between its two walls, includes at least one crystal 3 that makes possible an optimal legibility of the dial and of the displays of the watch, which filters the radiations emitted by the watch towards the outside of the case, and which protects the watch from radiations coming from the outside of the case.

The back 2 is removable, and advantageously includes a rapid attachment making it possible to rapidly open the case, for example with an eccentric toggle lever or similar, and making it possible to close it both rapidly and in a water-resistant manner. The watch is inserted into the case through the back. The fact of fastening the back 2 to the casing 1 pushes the watch against the pistons that then compress the springs, which makes it possible to ensure the good resistance of the watch in the case, and thereby ensuring that there is no play.

The case may include actuators 7, levers, push-pieces, pull-out pieces, to actuate the actuators of the watch.

The invention makes it possible to limit the volume of the outer case thanks to the good thermal insulation at the bearing points on the watch, to also limit its weight, and to make possible to the user a normal manipulation of their watch.

The invention claimed is:

1. A thermal protection case for a timepiece, comprising, within a casing, a holding mechanism for holding a timepiece case of the timepiece, wherein said holding mechanism includes, in order to come to bear on a same first side of said timepiece case at least two first elastic pistons each including a first mobile support arranged to come to bear on said first side of said timepiece case and each including at least one component thermally less conductive than said casing and than said timepiece case and creating a thermal barrier between said casing and said timepiece case, and wherein said holding mechanism further includes, in order to come to bear on a same second side of said timepiece case opposite said first side, at least three second supports each consisting of, either a pillar made of material thermally less conductive than said casing and than said timepiece case and constituting a fixed banking support, or of a second elastic piston including a second mobile support arranged to come to bear on said timepiece case and including at least one component thermally less conductive than said casing and than said timepiece case and creating a thermal barrier between said casing and said second mobile support.

2. The thermal protection case according to claim 1, wherein said casing includes at least one insulator casing and a back arranged to cooperate with one another in a water-resistant closing position under an action of closing means, said insulator casing and/or said back including or carrying a crystal fastened in a water-resistant manner and arranged for observation of one said timepiece enclosed in said thermal protection case.

3. The thermal protection case according to claim 2, wherein said insulator casing and/or said back and/or said crystal constitutes a double-walled Arsonval-Dewar vessel with an inner vacuum between two walls of said double-walled Arsonval-Dewar vessel.

4. The thermal protection case according to claim 2, wherein said insulator casing includes housings each arranged to house a first elastic piston and including a banking bearing surface of one end of said first elastic piston.

5. The thermal protection case according to claim 2, wherein at least one said first mobile support operates like a piston, and is arranged to push one said timepiece case, under an action of an elastic return means included in said first elastic piston, the at least one said first mobile support is held in a housing by a plate, the plate being fastened by screws and pins on a bearing surface to ensure a positioning, so that, when one said timepiece case is installed in said thermal protection case, said pistons are compressed and are not abutting against said plates and wherein the at least one said plate is fastened on a bearing surface included in said insulator casing.

6. The thermal protection case according to claim 2, wherein said back includes at least one shock-resistant lower banking made of material thermally less conductive than said timepiece case and which is, in a nominal unlocked position, at a distance from one said timepiece bearingly mounted on said at least three second supports, and which is arranged to constitute a banking limiting a travel of said timepiece during a shock unpoising it in relation to said second supports.

7. The thermal protection case according to claim 6, wherein said thermal protection case includes at least three first elastic pistons, of which at least two are identical and constitute a pair arranged to exert distant and symmetrical presses on one said timepiece case, the at least one said shock-resistant lower banking is elastic, or constitutes, with a crosspiece supporting transverse bankings, a chamber containing an elastic return means.

8. The thermal protection case according to claim 6, wherein said thermal protection case includes at least four first elastic pistons, constituting two pairs arranged to exert distinct presses on one said timepiece case located on either side of said timepiece, the at least one said shock-resistant lower banking includes an elastic axial banking support for a longitudinal positioning of one said timepiece along a plane of symmetry of horns of said timepiece.

9. The thermal protection case according to claim 1, wherein at least one said first mobile support is arranged to push one said timepiece case, under an action of an elastic return means included in said first elastic piston.

10. The thermal protection case according to claim 1, wherein at least one said first mobile support is arranged to push one said timepiece case, under an action of an elastic return means included in said first elastic piston, the at least one said first mobile support is held in a housing by a plate, the plate being fastened by screws and pins on a bearing surface to ensure a positioning, so that, when one said timepiece case is installed in said thermal protection case, said pistons are compressed and are not abutting against said plates.

11. The thermal protection case according to claim 1, wherein said thermal protection case includes at least three first elastic pistons, of which at least two are identical and constitute a pair arranged to exert distant and symmetrical presses on one said timepiece case.

12. The thermal protection case according to claim 1, wherein said thermal protection case includes at least four first elastic pistons, constituting two pairs arranged to exert distinct presses on one said timepiece case located on either side of said timepiece.

13. The thermal protection case according to claim 1, wherein said casing includes at least one communication port between an inner volume of said casing and an outside environment, that can be enclosed in a water-resistant manner and arranged to extract gas contained in said casing, or inject gas into said casing.

14. The thermal protection case according to claim 1, wherein said casing includes at least one control port between an inner volume of said casing and an outside environment arranged to receive in a water-resistant manner an actuator for an action of a user on a crown or a push-piece or a control pull-out piece included in said timepiece.

15. The thermal protection case according to claim 1, wherein the components made of material thermally less conductive than said timepiece case are made of PTFE, or of infusible crystalline structure polyimide.

16. A timepiece assembly a comprising the thermal protection case according to claim 1, and the timepiece including the timepiece case of a geometry compatible with said first mobile supports and with said second supports included in said thermal protection case.

* * * * *